(12) United States Patent
Liu et al.

(10) Patent No.: US 9,509,792 B2
(45) Date of Patent: Nov. 29, 2016

(54) METHOD AND APPARATUS FOR CONTEXT-BASED GROUPING

(75) Inventors: Dong Liu, Beijing (CN); Wenwei Xue, Beijing (CN); Zhanjiang Song, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 578 days.

(21) Appl. No.: 13/812,110

(22) PCT Filed: Jun. 29, 2010

(86) PCT No.: PCT/CN2010/074674
§ 371 (c)(1),
(2), (4) Date: Jan. 24, 2013

(87) PCT Pub. No.: WO2012/000169
PCT Pub. Date: Jan. 5, 2012

(65) Prior Publication Data
US 2013/0185359 A1    Jul. 18, 2013

(51) Int. Cl.
G06F 15/16 (2006.01)
H04L 29/08 (2006.01)
G06F 17/30 (2006.01)

(52) U.S. Cl.
CPC ......... H04L 67/24 (2013.01); G06F 17/30035 (2013.01)

(58) Field of Classification Search
CPC ................. H04L 67/24; G06F 17/30035
USPC ........................................... 709/204
See application file for complete search history.

(56) References Cited

U.S. PATENT DOCUMENTS

| 7,644,144 B1 * | 1/2010 | Horvitz et al. ............... 709/223 |
| 2005/0188062 A1 * | 8/2005 | Li et al. ........................ 709/220 |
| 2008/0222142 A1 * | 9/2008 | O'Donnell ..................... 707/5 |

FOREIGN PATENT DOCUMENTS

| CN | 1482771 A |   | 3/2004 |
| CN | 1630277 A |   | 6/2005 |
| CN | 1905466 A |   | 1/2007 |
| CN | 1925416 A |   | 3/2007 |
| CN | 1925416 A | * | 3/2007 |
| CN | 101754182 A |   | 6/2010 |
| CN | 101754182 A |   | 6/2010 |

OTHER PUBLICATIONS

Office Action for corresponding Chinese Patent Application No. 201080068549.4, dated Nov. 10, 2015, with English-language summary, 9 Pages.

(Continued)

Primary Examiner — Tauqir Hussain
Assistant Examiner — Javier O Guzman
(74) Attorney, Agent, or Firm — Ditthavong & Steiner, P.C.

(57) ABSTRACT

An approach is provided for determining context-based groups based on context information. An input from a device specifying one or more criteria to determine a context-based group from among a plurality of other devices is received. The context information associated with the plurality of other devices is determined. The context-based group is determined based, at least in part, on the context information and the criteria.

14 Claims, 12 Drawing Sheets

(56) References Cited

OTHER PUBLICATIONS

Chinese Office Action for related Chinese Patent Application No. 201080068549.4 dated May 22, 2015, with English-language summary, 15 Pages.

International Search Report for PCT/CN2010/074674 mailed Apr. 7, 2011.

Office Action for corresponding Chinese Patent Application No. 201080068549.4 dated Mar. 3, 2016, with English-language summary, 10 Pages.

Office Action for corresponding Taiwanese Patent Application No. 100122646, dated Aug. 12, 2016, English Language Summary included, 5 pages.

* cited by examiner

METHOD AND APPARATUS FOR CONTEXT-BASED GROUPING

RELATED APPLICATIONS

The present application is a US National Phase application of PCT Application No. PCT/CN2010/074674, entitled "Method and Apparatus for Context-based Grouping," filed on Jun. 29, 2010, incorporated by reference herein in its entirety.

BACKGROUND

Service providers and device manufacturers (e.g., wireless, cellular, etc.) are continually challenged to deliver value and convenience to consumers by, for example, providing compelling network services. One area of interest has been in the development of means for facilitating communications among an increasingly connected community of users. For example, it is noted that the number and variety of available forms of communications (e.g., voice calls, text messaging, e-mails, interactive chats, social networking, etc.) has increased greatly. This increase, however, has also made it more difficult for users to create or otherwise manage contact groups, lists, etc. Accordingly, service providers and device manufacturers face significant technical challenges to facilitating efficient and user-friendly contact group management.

SOME EXAMPLE EMBODIMENTS

Therefore, there is a need for an approach for dynamically grouping users based on context.

According to one embodiment, a method comprises receiving an input from a device specifying one or more criteria to determine a context-based group from among a plurality of other devices. The method also comprises determining context information associated with the plurality of other devices. The method further comprises determining the context-based group based, at least in part, on the context information and the one or more criteria.

According to another embodiment, an apparatus comprising at least one processor, and at least one memory including computer program code, the at least one memory and the computer program code configured to, with the at least one processor, cause, at least in part, the apparatus to receive an input from a device specifying one or more criteria to determine a context-based group from among a plurality of other devices. The apparatus is also caused to determine context information associated with the plurality of other devices. The apparatus is further caused to determine the context-based group based, at least in part, on the context information and the one or more criteria.

According to another embodiment, a computer-readable storage medium carrying one or more sequences of one or more instructions which, when executed by one or more processors, cause, at least in part, an apparatus to receive an input from a device specifying one or more criteria to determine a context-based group from among a plurality of other devices. The apparatus is also caused to determine context information associated with the plurality of other devices. The apparatus is further caused to determine the context-based group based, at least in part, on the context information and the one or more criteria.

According to another embodiment, an apparatus comprises means for receiving an input from a device specifying one or more criteria to determine a context-based group from among a plurality of other devices. The apparatus also comprises means for determining context information associated with the plurality of other devices. The apparatus further comprises means for determining the context-based group based, at least in part, on the context information and the one or more criteria.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for dynamically grouping users based on context are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
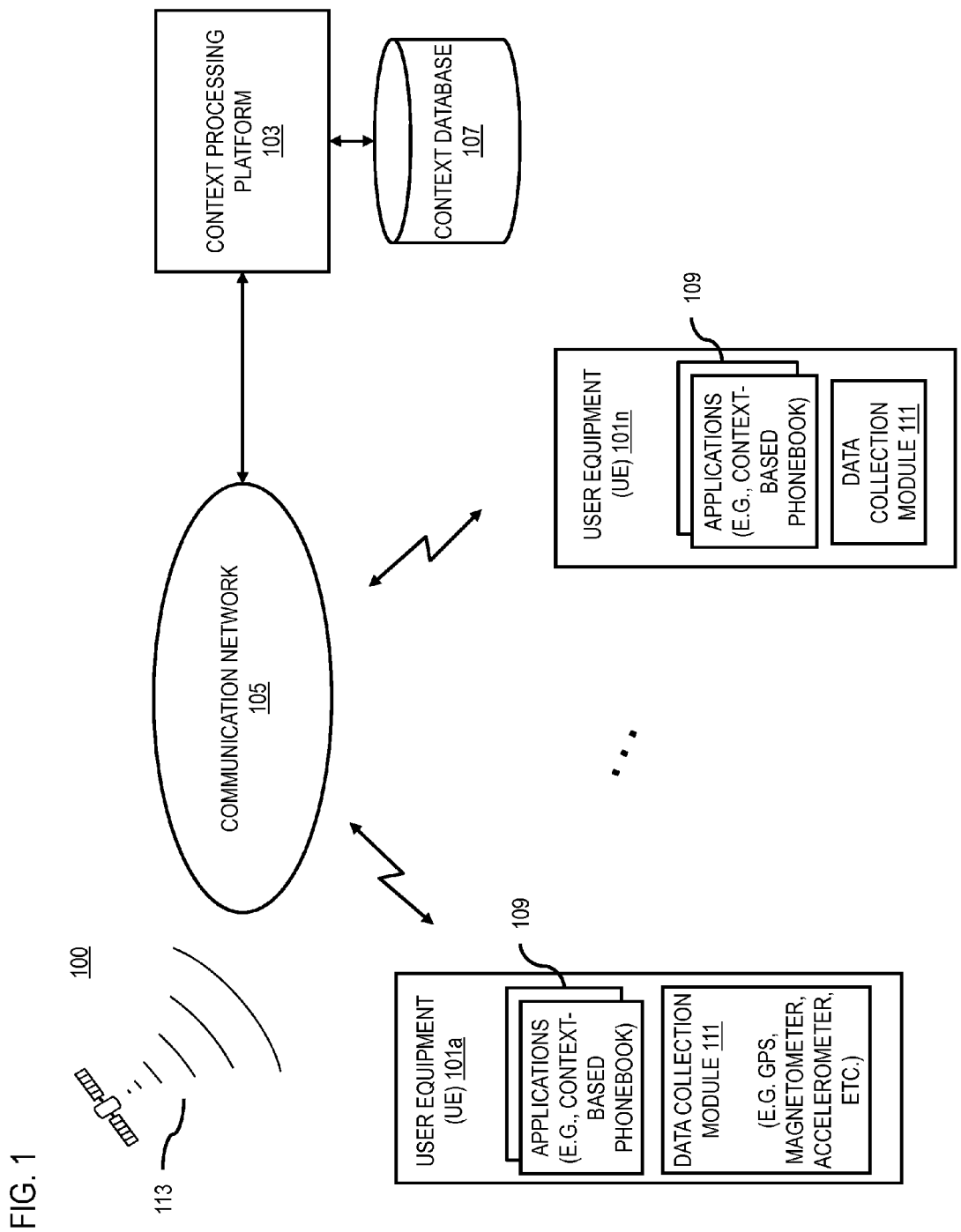
FIG. 1 is a diagram of a system capable of dynamically grouping users based on context, according to one embodiment.

FIG. 1 is a diagram of a system capable of dynamically grouping users based on context, according to one embodiment. Traditionally, devices such as mobile devices and applications (e.g., instant messaging, e-mail, etc.) on computing devices support manual grouping of contacts and corresponding name-based searching or sorting of those contacts. For example, a phonebook of a mobile device may be integrated with instant messaging features and/or social networking services. Users of the devices may group contacts based on features of the instant messaging and/or social networking services.

As noted above, modern users have become accustomed to have a variety ways (e.g., calls, messaging, chats, etc.) for remaining in touch with any number of communities of other users (e.g., social networking communities, communities of friends or coworkers, etc.). This variety, in turn, makes it much more difficult for users to maintain current contacts/contact groups or to discover new contacts because of the increased potential numbers of contacts associated with any one user. Because of the potential burden of maintaining multiple contacts or contact groups involving larger numbers of contacts, users often are discouraged from creating groups or may otherwise fail to take advantage of grouping features.

To address this problem, a system 100 of FIG. 1 introduces the capability to dynamically group users or potential contacts based on context. More specifically, a user of the system 100 can specify a search condition or criteria over context attributes of potential contacts to define a dynamic group. In one embodiment, the dynamic group can be stored in a phonebook or contact list of the user's device. For example, the dynamic group can be a group (e.g., a context-based group or a context group) based on the context attributes of users. Moreover, potential contacts whose current context satisfies the specified criteria associated with a context-based group will automatically become a current member of the context-based group. In yet another embodiment, the system 100 can update the context-based group continuously (e.g., in real-time) so that the context-based group remains dynamic and up-to-date in the phonebook or contact list of the user's device. The user can then invoke different communication services (e.g., phone calls, messaging, etc.) over the context-based group.

As shown in FIG. 1, user equipment (UEs 101a-101n) can connect to a context processing platform 103 via a communication network 105 to obtain dynamic grouping services. Moreover, the context processing platform 103 can receive context information from the UEs 101 and store the context information in a context database 107. The context database 107 can include identifiers to each UE 101 as well as associated context information. Further, the context information can be any one of multiple types of information that can provide conditions that a user may use to specify for creating a context-based group. For example, context information may include location information, camera information, microphone information, environmental sensor information, weather information, user calendar information, accelerometer information, compass information, body temperature information, etc. In one embodiment, context information may be collected by individual UEs 101 via an application 109 (e.g., a context-based phonebook application, a calendar application, etc.). For example, an application 109 may utilize a data collection module 111 that includes one or more sensors to obtain context information. In certain embodiments, a UE 101 can utilize sensors such as a global positioning system (GPS) to access GPS satellites 113 to determine context information (e.g., the location of the user). Further, the application 109 may query one or more other applications (e.g., a calendar application) or services (not shown) to retrieve context information. Each UE 101a-101n in the system 100 may transmit context information associated with the user of each respective UE 101a-101n to the context processing platform 103.

An application 109 on one of the UEs 101a associated with a user can then utilize the information stored on the context processing platform 103. The application 109 can receive an input specifying one or more criteria to determine a context-based group from among a plurality of other UEs 101. This information can be transmitted via a communication network 105 to the context processing platform 103. The context processing platform 103 receives the input and may associate the input as a query associated with the UE 101a. The criteria can include one or more context attributes associated with UEs 101 along with one or more relationship parameters. In certain embodiments, a context attribute is a type of user context available on a UE 101. Examples include location, time, calendar information, accelerometer information, compass information, body temperature information, outside weather information, etc. Further, relationships may include relationships to one or more context attributes of the UE 101a and/or fixed parameters. In one example, the input can include criteria specifying that the user wishes to create a context-based group of people that are within a particular distance of the user. In another example, the input can include criteria specifying that the user wishes to create a context-based group of people/UEs 101 that are in a particular region (e.g., a particular distance from the user's home, in a particular area such as a park, etc.). Moreover, in another example, the criteria can include grouping based on whether other users are to attend the same meeting as the user of the UE 101a.

When the context processing platform 103 receives the input, the context processing platform 103 queries the context database 107 for context information of the people using UEs 101 to determine the context-based group. In certain embodiments, the context processing platform 103 queries every user of the context processing platform 103. In other embodiments, the query is bounded by relationships to the user. For example, the query can be limited to people that the user has as contacts on the user's UE 101a. In another example, the query can be limited based on other rules, such as whether the people have something in common with the user (e.g., same college, same city, same employer, etc.). After the context processing platform 103 retrieves the context information from the user of the UE 101a and the other people using UEs 101, the context processing platform 103 determines the context-based group based, at least in part, on the context information and the specified criteria.

The information in the context database 107 can be continuously changing, thus, once the input request is received, the context processing platform 103 continuously or periodically update the context-based group based on the criteria. As such, the user may specify parameters for the context processing platform 103 to update the UE 101a of changes to the context-based group. In certain embodiments, the context processing platform 103 can determine one or more updates to the context information periodically or based on changes in the context information of one or more of the users. Then, the context processing platform 103 can update the context-based group based on the one or more updates.

In one example, the user specifies criteria creating a context-based group based on whether the contacts in the user's phonebook are at a particular region (e.g., a particular park). The other users can upload location information to the context processing platform 103. If the context processing platform 103 determines that the other users are within the particular park, then the users can be added to the context-based group. The context-based group can then be sent to the UE 101a. Further, if one of the other users leaves the particular park, the context-based group can be updated to remove that other user from the context-based group.

Regions can be created by users and/or be predetermined. For example, the regions may be selected based on one or more maps and/or one or more map databases. This information may be stored in one or more other databases associated with the context processing platform 103.

The user can utilize the context-based groups in various applications 109. In one application 109, the context-based groups are utilized to dynamically sort contacts of the user or other people that may be associated with the user. In one example, a person that may be associated with the user may be a person with one or more memberships to a group known to the user (e.g., a biking group that likes to bike through parks of the user's city). Contacts of the user can be presented via a user interface (e.g., a phonebook user interface). The user interface may be utilized to receive criteria to generate context-based groups. As such, the user can enter the query and a group can be formed for the query (e.g., based on interaction with the context processing platform 103). Once a context-based group is received, the context-based group can be presented to the user. Further, the context-based group may be utilized to present one or more actions to the user. These actions can include, for example, group interactions, such as sending communications to the group, chatting with the group, showing the position of the members of the group on a map, etc. as well as personal interactions with a member of the sorted group. Further, in certain embodiments, the groups may show information associated with individual members of the group. For example, if the group is based on a distance from the user's UE 101a, the display of the group may include corresponding distances of the users from the UE 101a.

In one example, the query can include more than one attribute and/or relationship. In this example, the user can search for contacts within a certain distance of a location and who is free. The attribute of "free" may be based on a presence status of a user (e.g., set by the user). When the group is formed, the user may perform a group communication. In this example, the user may be expecting a delivery at home, but is stuck in traffic. As such, the group communication to users near the user's home can be to ask for help to receive the package.

In another example, the user may insert a criterion of movie (e.g., a particular movie) and a relationship of recently watched. This information may be stored on a social networking site. In certain embodiments, an application programming interface can be utilized by the context processing platform 103 to retrieve context information from external platforms such as the social networking site, a messaging site (e.g., for presence information), etc. The user may then form a group based on the criteria and context information associated with the users of the UEs 101. The group may be selected for an action to allow the other users to view a journal or blog the user wrote about the particular movie. In this manner, the user may set access rights to content based on the context-based group.

Another use for context information may be to create a carpool service. For example, the user wishes to go to a particular location. The user may set a query for a group of people going to the particular location or around the particular location (e.g., towards the particular location) and is nearby the user currently. If there are group members, the user may contact the group members and request a ride.

In one embodiment, the context processing platform 103 can host a service and/or provide information to a service to provide real-time opportunities to services for users. A user can generate a query for a service based on criteria and send the criteria to the context processing platform 103. The context processing platform 103 can then determine a group based on the criteria. The user may be provided an opportunity to manually filter one or more of the users of the group. Then, the user can select one or more members of the group to perform a transaction. The members of the group can be ranked according to how well the user meets the criteria. For example, if "nearby home" is the criteria, the users closest to "home" can be ranked first.

In certain embodiments, the service can have access to the context-based group and the context-based group can be invited to join in the service. As such, the other users may leave the context-based group upon request. Further, the context-based group can be automatically updated when context information of UEs 101 associated with the other users' changes. Further, messages (e.g., text, audio, video, etc.) can be sent by the user to the other users (e.g., as a group).

Users may have the ability to specify whether or not the user would like to be invited to groups of one or more services (e.g., via one or more subscriptions). As such, a potential group member can specify whether the user would like to be a part of a group created by a particular user and/or events at particular locations, etc. Further, under certain circumstances, the users can set privacy parameters. For example, users can specify to be invisible so that the user can receive communications associated with the context-based group, but other members of the context-based group are not aware that the user is present. At times the initiating UE (e.g., UE 101a) can select privacy parameters (e.g., by selecting that members cannot be invisible).

Additionally, with respect to privacy, the context processing platform 103 can limit certain context information based on user profiles. As such, the users may determine what information the user wishes to share with whom, for example, by only allowing people with particular information (e.g., know the user's phone number and name, is a contact of the user, etc.) about the user to access the context information. Additionally, different context attributes can be set to different privacy parameters. For example, a location of the user can only be seen by contacts labelled as friends, corporate calendar information can only be viewed by contacts labelled as colleagues, chatting is only available to contacts, etc.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LIE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101 and context processing platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the context processing platform 103 may interact according to a client-server model with the applications 109 of the UE 101. According to the client-server model, a client process sends a message including a request to a server process, and the server process responds by providing a service (e.g., context-based grouping, social networking, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
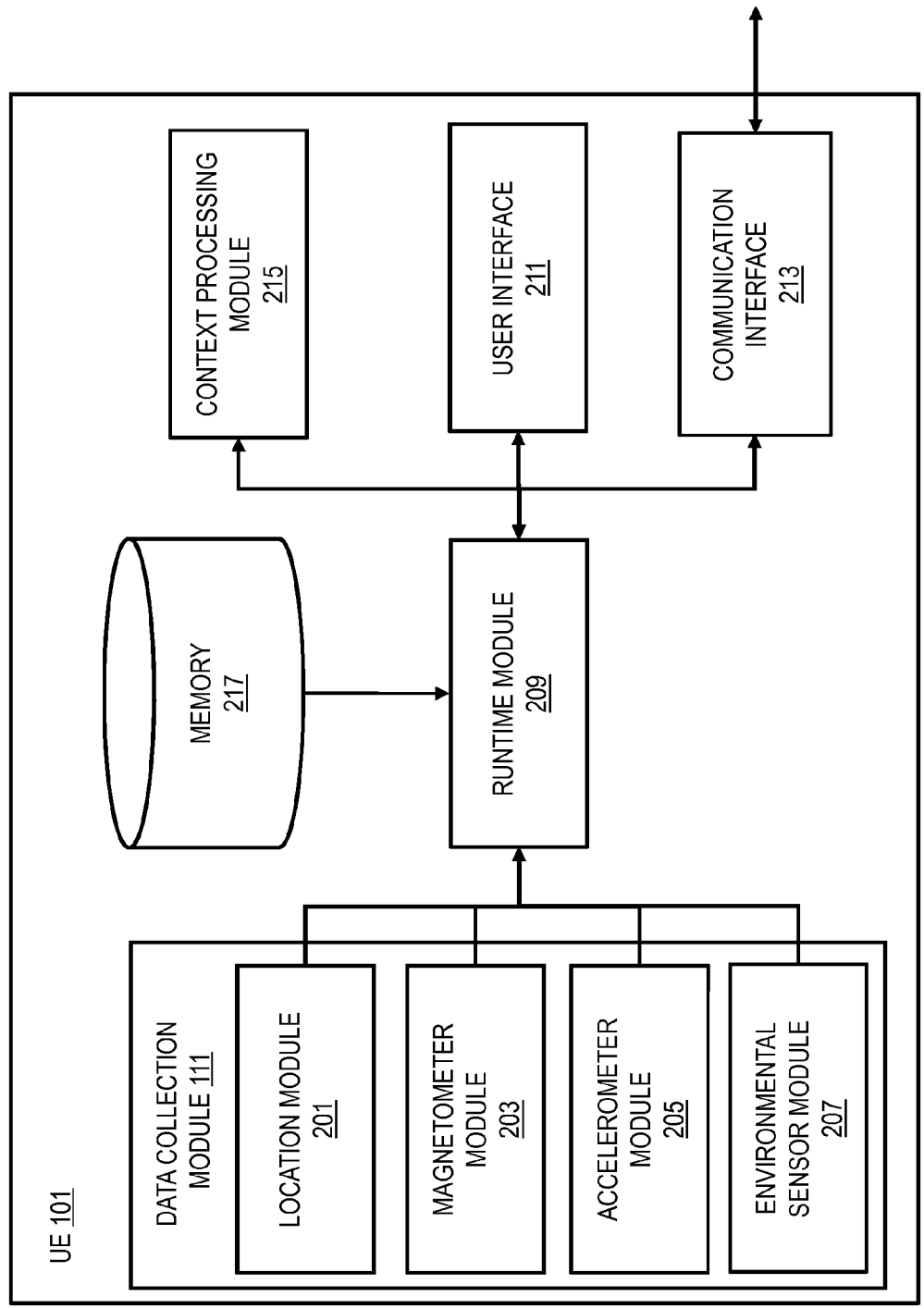
FIG. 2 is a diagram of the components of user equipment, according to one embodiment.

FIG. 2 is a diagram of the components of user equipment, according to one embodiment. By way of example, a UE 101 includes one or more components for dynamically grouping users based on context. It is contemplated that the functions of these components may be combined in one or more components or performed by other components of equivalent functionality. In this embodiment, the UE 101 includes a data collection module 111 that may include one or more location modules 201, magnetometer modules 203, accelerometer modules 205, environmental sensor modules 207, the UE 101 can also include a runtime module 209 to coordinate the use of other components of the UE 101, a user interface 211, a communication interface 213, a context processing module 215, and memory 217. An application 109 (e.g., the context-based phonebook application) of the UE 101 can execute on the runtime module 209 utilizing the components of the UE 101.

The location module 201 can determine a user's location. The user's location can be determined by a triangulation system such as GPS, assisted GPS (A-GPS), Cell of Origin, or other location extrapolation technologies. Standard GPS and A-GPS systems can use satellites 113 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory 217 and are transmitted to the context processing platform 103 via the communication interface. Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory 217 and/or transmitted via the communication interface 213 to the context processing platform 103.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In one embodiment, vertical directional data obtained from an accelerometer is embedded into the metadata of captured or streaming media or otherwise associated with the UE 101 by the location services application 109. In certain embodiments, the magnetometer module 203 and accelerometer module 205 can be means for ascertaining a perspective of a user. This perspective information may be stored in the memory 217 and sent to the context processing platform 103.

Moreover, the environmental sensor module 207 can determine atmospheric conditions surrounding the UE 101. Such atmospheric conditions may include humidity, temperature, body temperature of the user, other biometric data of the user, etc. Once again, this information can be stored in the memory 217 and sent to the context processing platform 103. In certain embodiments, information collected from the data collection module 111 can be retrieved by the runtime module 209 and stored in memory 217. Then periodically, the information can be transmitted to the context processing platform 103.

In one embodiment, the communication interface 213 can be used to communicate with the context processing platform 103 or other UEs 101. Certain communications can be via methods such as an internet protocol, messaging (e.g., SMS, MMS, etc.), or any other communication method (e.g., via the communication network 105). In some examples, the UE 101 can send context information associated with the UE 101 to the context processing platform 103. In other examples, the user can utilize a user interface 211 to generate a query for context-based groups to send to the context processing platform 103. Further, the communication interface 213 can be utilized to communicate with other UEs 101.

The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc. In certain embodiments, the user interface 211 and/or runtime module 209 can be means for causing presentation of context-based grouping queries and results. Example user interfaces of such grouping queries, results, and actions performed as part of the results are shown in FIGS. 6-8D.

The context processing module 215 may be utilized in determining context information from the data collection module 111 and/or applications 109 executing on the runtime module 209. This information may be caused to be transmitted, via the communication interface 213 to the context processing platform 103. The context processing module 215 may additionally be utilized as a means for determining groups based on input criteria and received context information associated with other UEs 101.

Figure 3:
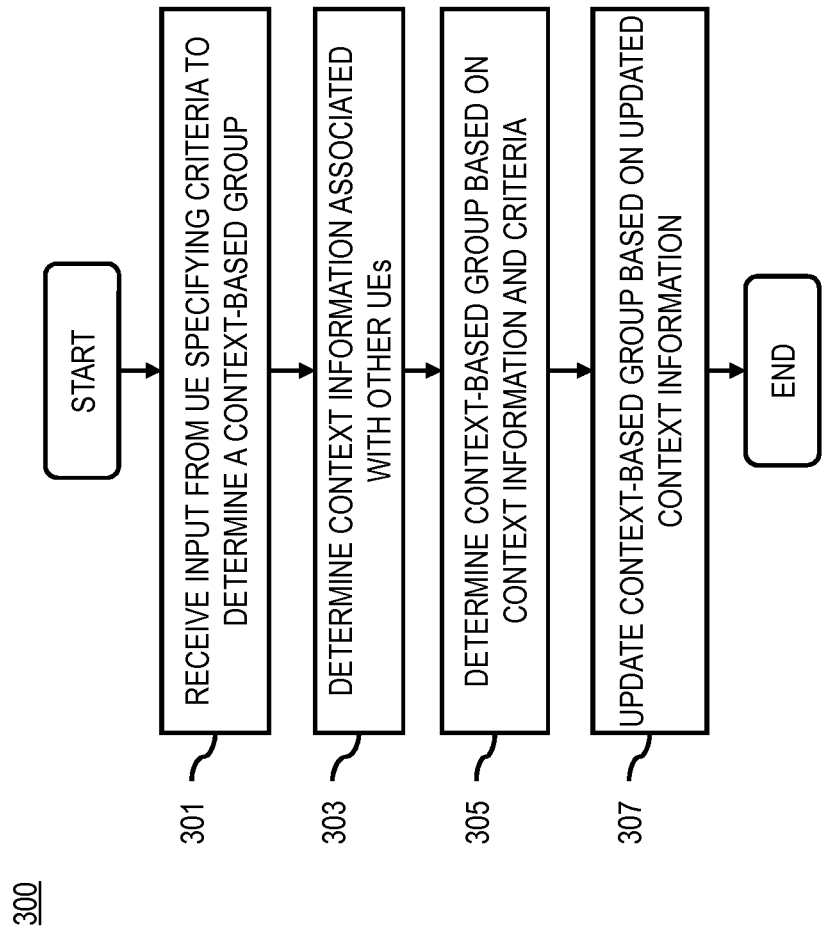
FIG. 3 is a flowchart of a process for determining a context-based group based on context information and criteria, according to one embodiment.
Figure 10:
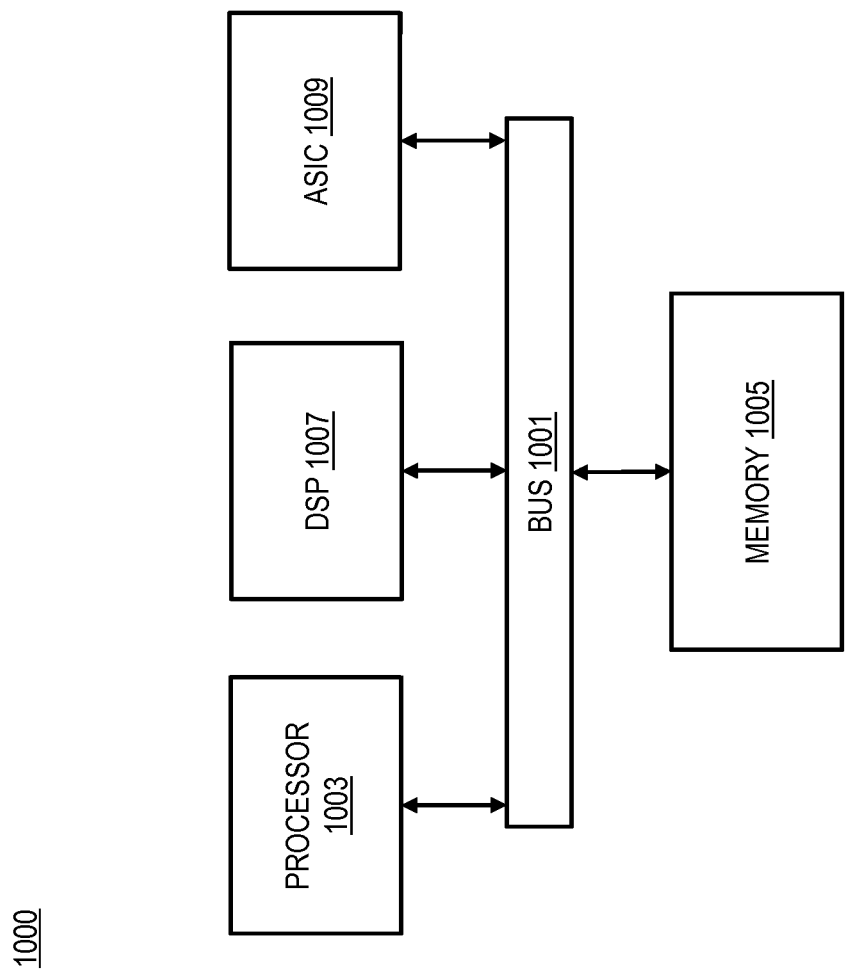
FIG. 10 is a diagram of a chip set that can be used to implement an embodiment of the invention.

FIG. 3 is a flowchart of a process for determining a context-based group based on context information and criteria, according to one embodiment. In one embodiment, the context processing platform 103 and/or an application 109 of the UE 101 performs the process 300 and is implemented in, for instance, a chip set including a processor and a memory as shown in FIG. 10. As such, the context processing platform 103 and/or application 109 can provide means for accomplishing various parts of the process 300 as well as means for accomplishing other processes in conjunction with other components of the context processing platform 103 and/or UE 101. Throughout this process, the context processing platform 103 is referred to as completing various portions of the process 300, however it is understood that the UE 101 can perform some of and/or all of the selected process steps.

In step 301, the context processing platform 103 determines to receive an input from a UE 101*a* specifying one or more criteria to determine a context-based group from among a plurality of other UEs 101. The input can be received from the UE 101*a*, which would like to create the context-based group for use with the user's UE 101*a*. The input may be specified as further described in FIGS. 6 and 7A-7B. In certain embodiments, the UE 101*a* receives the input from a user interface. Further, the criteria can be specified in relation to context information associated with the UE 101*a*.

At step 303, the context processing platform 103 determines context information associated with the plurality of other UEs 101. As previously noted the context processing platform 103 receives updates of context information from the other UEs 101 as well as the UE 101*a*. The context information (e.g., location, calendar information, sensor information, etc.) can be collected at each of the UEs 101 and be transmitted to the context processing platform 103. The other UEs 101 can be selected in various manners. In one embodiment, the other UEs 101 can be contacts in a phonebook associated with the UE 101*a*. In another embodiment, the other UEs 101 can be otherwise associated with the UE 101*a* (e.g., a member of the same group) or be part of a public community. For example, the UEs 101 can be part of a real-time opportunistic community designed to share context information to provide users with the ability to contact each other. A real-time opportunistic community can refer to a group of people constituted dynamically (i.e., members of the group can change at any time) and have context attributes (e.g., volatile attributes) that match conditions specified by the criteria.

The context processing platform 103 determines the context-based group based, at least in part, on the context information and the one or more criteria (step 305). For example, if the input specifies criteria that specifies a request for a group of contacts within a certain distance of a particular location (e.g., the dynamic location of the UE 101*a*), the context processing platform 103 can parse the context information associated with each of the other UEs 101, determine location coordinates, and determine whether each of the other UEs 101 meets the criteria. In certain embodiments, the context-based group can be determined at the UE 101*a* based on context information provided to the UE 101*a*. Each of the other UEs 101 that meets the criteria based on the context information associated with the respective other UEs 101 is then caused to be associated with a group. This group can then be caused to be sent to the UE 101*a*. Further, the group can be saved and/or monitored by the context processing platform 103.

Then, the context processing platform 103 determines updates to the context information. At step 307, the updates to the context information can be utilized to update the context-based group. These updates can be in real-time or substantially in real-time. For example, the context processing platform 103 can monitor context information associated with the other UEs 101 as well as the context information associated with the UE 101a to determine updates to the context-based group based on the criteria and updated context information. The updated context-based group can then be caused, at least in part, to be transmitted to the UE 101a.

Figure 4:
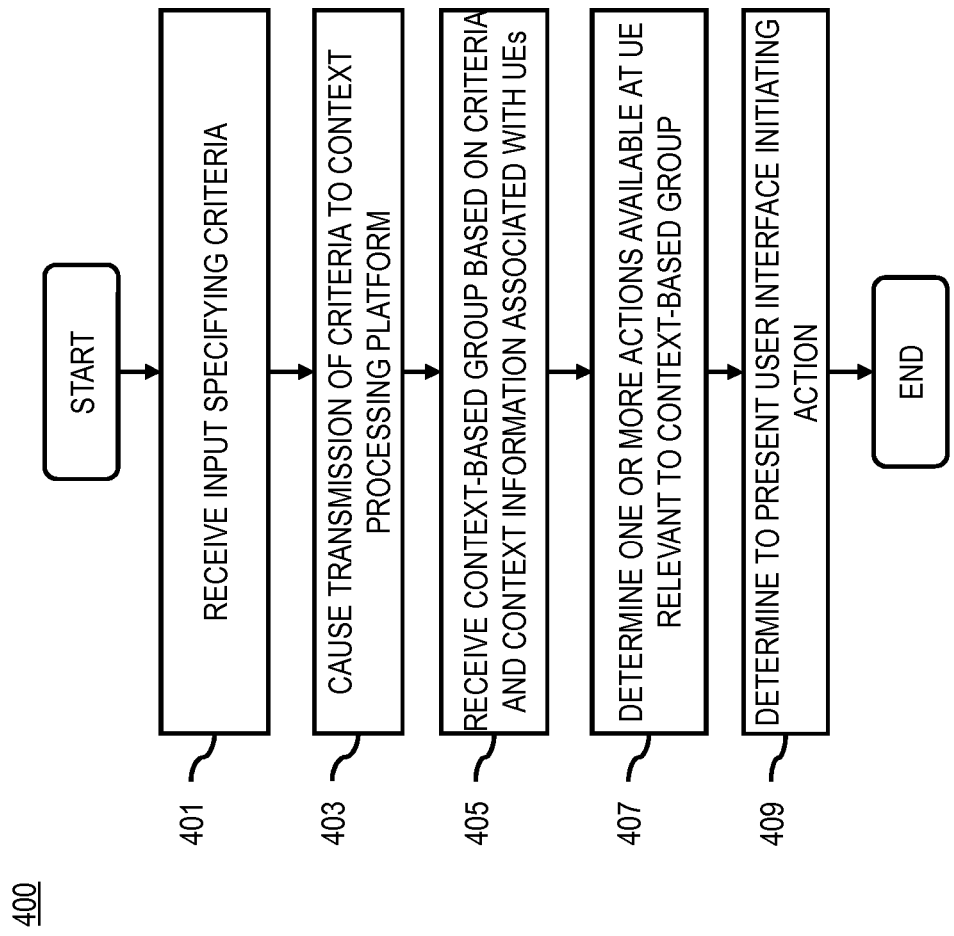
FIG. 4 is a flowchart of a process for utilizing context-based groups, according to one embodiment.

FIG. 4 is a flowchart of a process for utilizing context-based groups, according to one embodiment. In one embodiment, the application 109 and/or runtime module 209 performs the process 400 and is implemented in, for instance, a chip set including a processor and a memory as shown in FIG. 10. As such, the application 109 and/or runtime module 209 can provide means for accomplishing various parts of the process 400 as well as means for accomplishing other processes in conjunction with other components of the UE 101. Additionally or alternatively, the context processing platform 103 may perform one or more aspects of the process 400.

In step 401, the application 109 of a UE 101a receives input specifying one or more criteria to determine a context-based group from among a plurality of other UEs 101. The application 109 can receive the input from a user interface 211. Example user interfaces used to specify criteria are provided in FIGS. 6-7B. As previously noted, the criteria can include, for example, one or more context attributes of the user (e.g., a location of the user, a calendar entry of the user, a weather status associated with the user, a direction the user is facing, etc.), the UE 101a, or a fixed attribute along with one or more relationship parameters.

Then, at step 403, the application 109 causes, at least in part, transmission of the criteria to the context processing platform 103. The criteria can be sent as a query requesting a group to be formed based on the criteria and context information associated with one or more other UEs 101. The context processing platform 103 can process the criteria and/or context information according to various processes (e.g., the processes of FIG. 3, or FIG. 5). In response to the query, the application 109 receives a context-based group based on the one or more criteria and context information associated with the UEs 101 from the context processing platform 103 (step 405). In certain embodiments, the UE 101a receives the context information (e.g., from the context processing platform 103 and/or the other UEs 101) and determines the context-based group.

Once the context-based group is received, the context-based group can be caused to be presented on a user interface 211. The user interface 211 can additionally provide an option to save the context-based group. When the context-based group is saved, a request is sent to the context processing platform 103 to monitor the context information of the other UEs 101 to determine and update the context-based group. The application 109 can receive an input associated with the selecting a context-based group being presented. The selection of the group can cause the application 109 to determine one or more actions available at the device relevant to the context-based group (step 407). Relevancy can be determined based on the criteria chosen. For example, a map option can be available if a location is used in the criteria. In another example, a calendar option can be available if scheduling is utilized in the criteria. In yet another example, communications to the group and/or members of the group can be initiated. Other corresponding applications and/or options can be provided for various types of criteria. Then, the application 109 can determine to present a user interface for initiating at least one of the one or more of the actions (step 409). These actions can be selected (e.g., via a touch screen interface, a scroll and click interface, etc.). Once selected, the actions can be executed by the application 109 and/or another application on the UE 101a.

Figure 5:
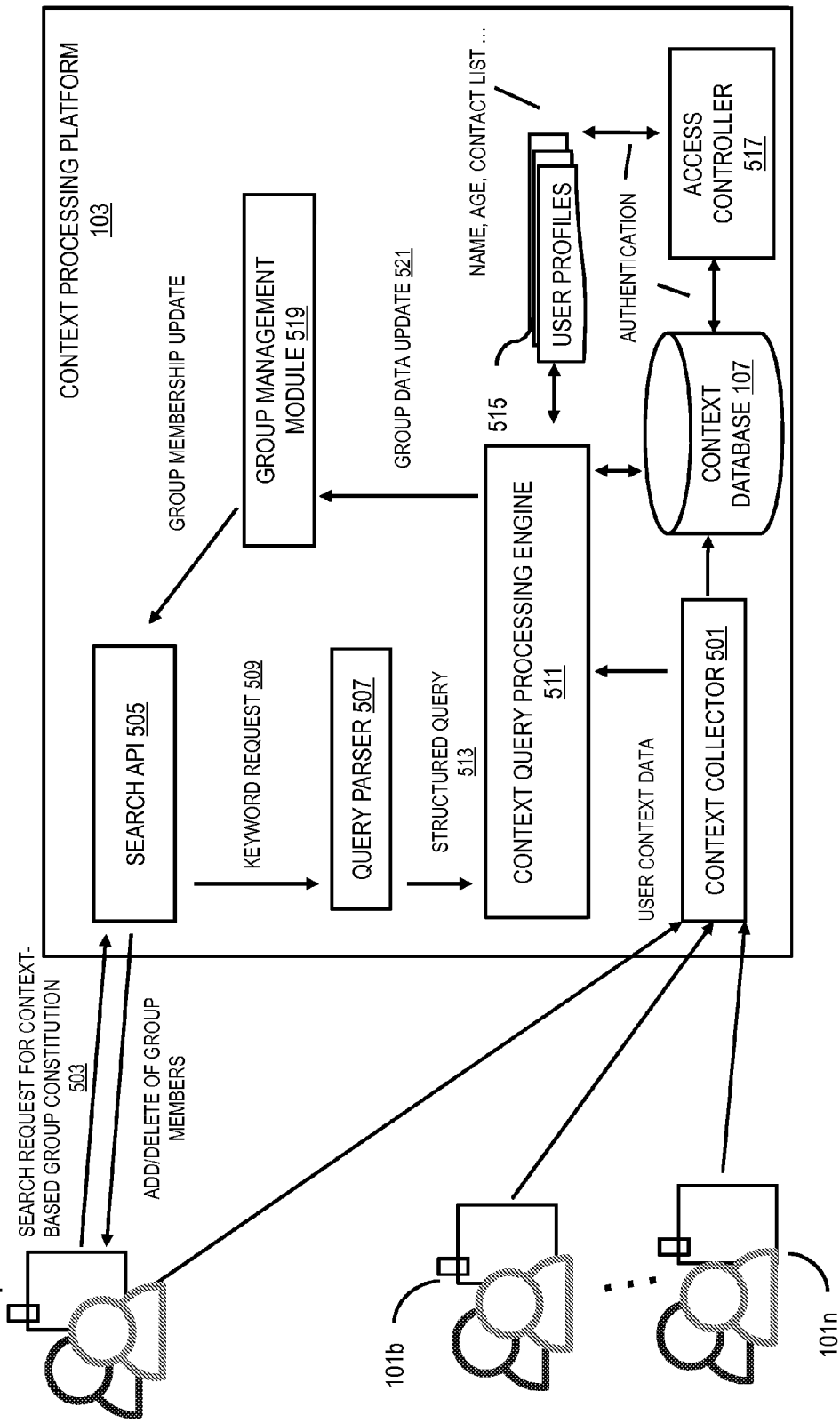
FIG. 5 is a system flow diagram of a process for determining context-based groups, according to one embodiment.

FIG. 5 is a system flow diagram of a process for determining context-based groups, according to one embodiment. As noted above, UEs 101a-101n can send context information to a context processing platform 103. A context collector 501 of the context processing platform 103 can receive the context information via a communication network 105. The context collector 501 can poll for updates to the context information and/or be pushed the information when a change occurs on a UE 101. The context collector 501 can further store the context information in a context database 107. The context information can be stored in or tied with a profile associated with each individual UE 101 and/or user of the UE 101.

Further, as noted above, a particular UE 101a can receive input to generate a context-based group. A query to the context processing platform 103 can be generated based on the input. Then, at step 503, the search request for generating a context-based group can be transmitted to a search Application Programming Interface (API) 505 of the context processing platform 103. The request can be in the form of one or more keywords and/or a structured query (e.g., a search based on one or more static options). If the request is a keyword request, the keyword request can be sent to a query parser 507 at step 509. The query parser 507 then determines a structured query from the keywords. In certain embodiments, the structured query can include one or more context attributes and one or more relationships. For example, a context attribute can be a location of the UEs 101 and the relationship can be whether the UEs 101 are within a bounded area, a region a certain distance from the querying UE 101a, etc.

The structured query can be sent to a context query processing engine 511 at step 513. The context query processing engine 511 can determine one or more UEs 101 to target based on the query. For example, the query may indicate a base set of UEs 101 to search (e.g., contacts of the querying UE 101a, all possible UEs 101 available, etc.). The context database 107 is then queried for historical context data of the users who match the base set of UEs 101 to search, utilizing the user profiles 515 (e.g. names, ages, interests, working companies, etc.) for query optimization and result filtering. The user profiles 515 can be received by the context query processing engine 511 via an access controller 517. A group meeting the criteria based on the context information associated with the user profiles 515 can then be generated. A group management module 519 can then be utilized to monitor and update the generated group (step 521). The group management module 519 can send the resulting context-based group and/or any updates of the context-based group to the search API 505 to return to the querying UE 101a. In certain embodiments, the updates are in the form of adding and/or deleting of members of the group. Further, user profile information for one or more members of the group can be sent to the querying UE 101a. This can allow for the querying UE 101a performing one or more actions associated with the context-based group based on collected context information.

In certain embodiments, the querying process can be mapped to a "people search" over a traditional database (e.g., a relational database with a Structured Query Language (SQL) interface). Search parameters from keywords can be converted into the parameters in a pre-defined SQL query template. Further, the user profiles utilized in the query may be filtered, for example based on one or more parameters (e.g., based on whether the users are contacts of the querying user, whether the users are a member of a particular static group, etc.).

Figure 6:
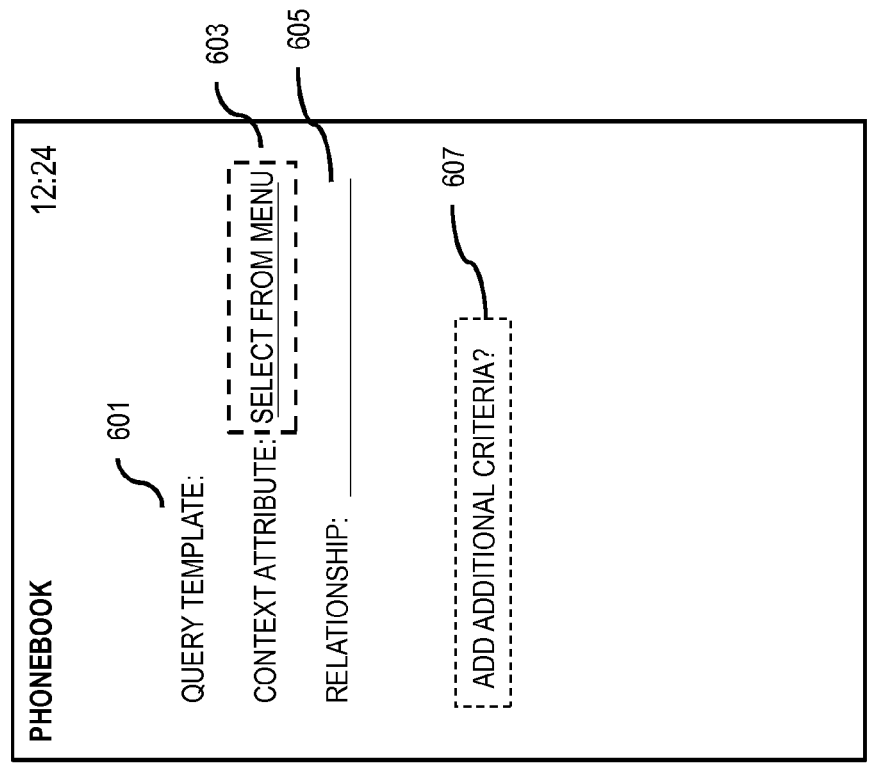
FIGS. 6-8D are diagrams of user interfaces utilized in the processes of FIGS. 3-5, according to various embodiments.

FIG. 6 is a diagram of a user interface utilized in the processes of FIGS. 3-5, according to one embodiment. In this user interface 600, a structured query is allowed to be formed in the form of a template 601. As such, the query template 601 can be utilized to select context attributes 603 and/or relationship parameters 605 that other UEs 101 need to meet to satisfy a context-based group query. Additional criteria can be added to the query to generate a context-based group. This query can be caused to be transmitted to the context processing platform 103 for processing (e.g., optimization and/or execution). Moreover, additional criteria 607 can be added to the query to filter UEs 101.

In one example, a structured query can be generated based on a context attribute 603 of location and a relationship 605 as in a particular park. When a context-based group is formed, the user is able to contact each of his friends in the particular park to perform a group communication. Additionally or alternatively, structured queries can be formed using keywords as further described in FIGS. 7A-7B.

Figure 7A:
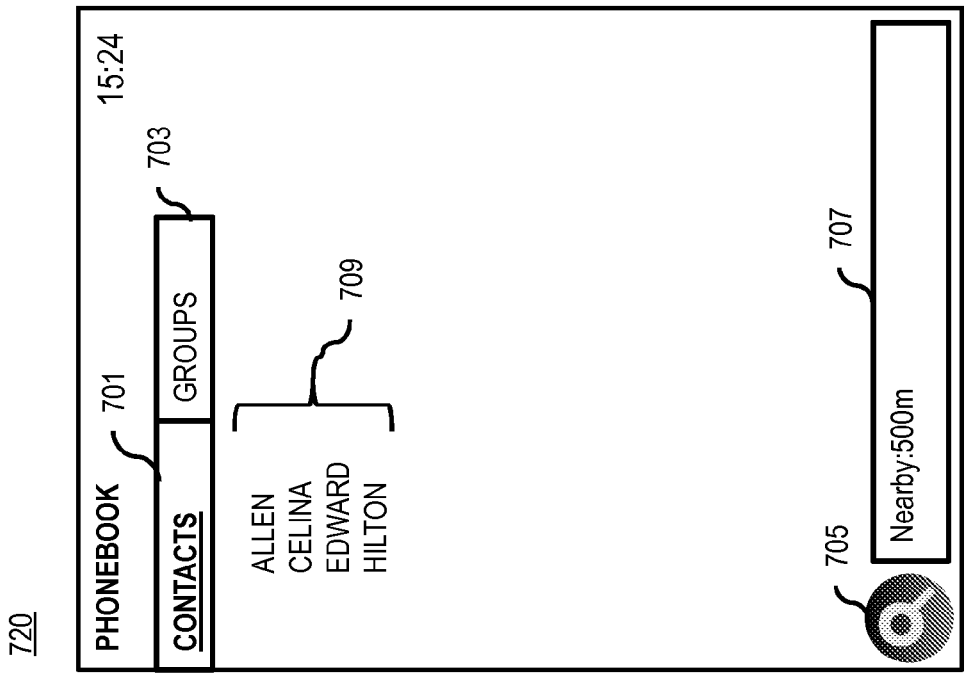
Figure 7B:
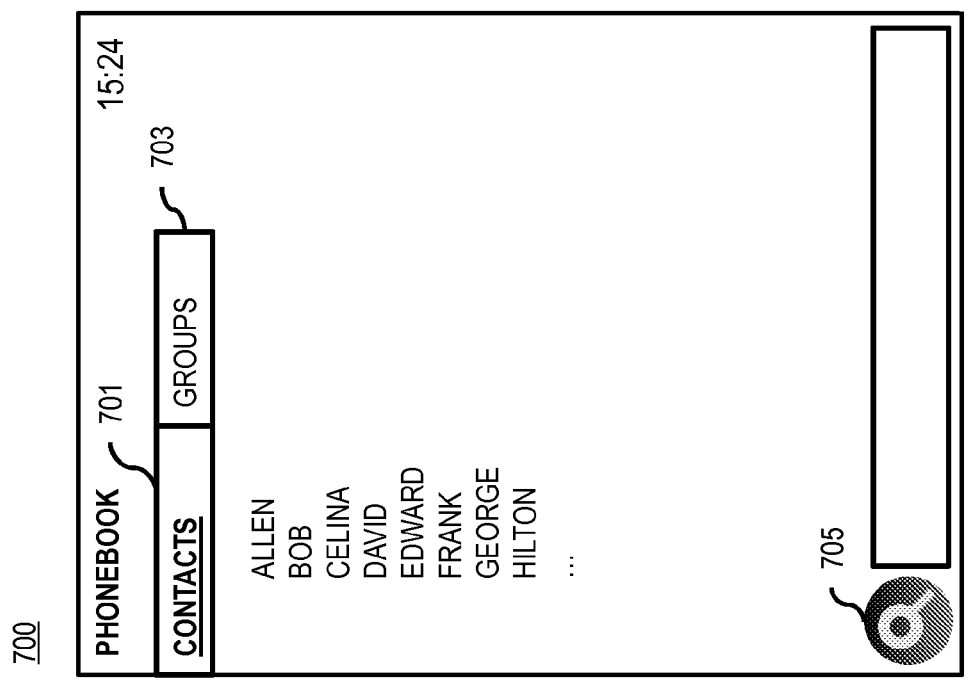

FIGS. 7A-7B are diagrams of user interfaces utilized in the processes of FIGS. 3-5, according to various embodiments. User interface 700 includes presentation of a phonebook application. The user of the UE 101 associated with the user interface 700 is provided the option of viewing contacts 701 using the phonebook or viewing contacts based on context-based groups 703. Context-based groups can be specified using a keyword input 705.

As shown in FIG. 7B, the user interface 720 can include a keyword input field 707 including the criteria of "Nearby" and the parameter of 500 m. In this scenario, the user's position context information can be automatically used as base parameter for a relationship between the user and the users of other UEs 101. As such, contacts that are nearby the user with a distance of no more than 500 meters can be placed in the context-based group 709. The criteria can be sent to a context processing platform 103 for processing to generate the group 709. Then, the UE receives the group 709 from the context processing platform 103. In other scenarios, the UE 101 can receive context information associated with the other users to determine the group 709. The context-based group 709 can then be saved. When saved, the context-based group 709 can change based on updated context information associated with the other users.

Figure 8A:
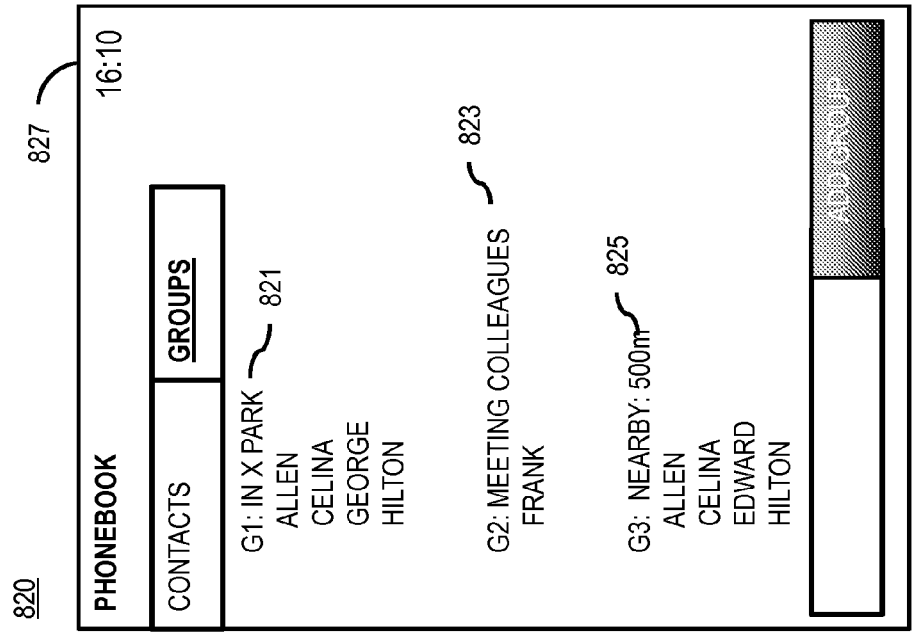
Figure 8B:
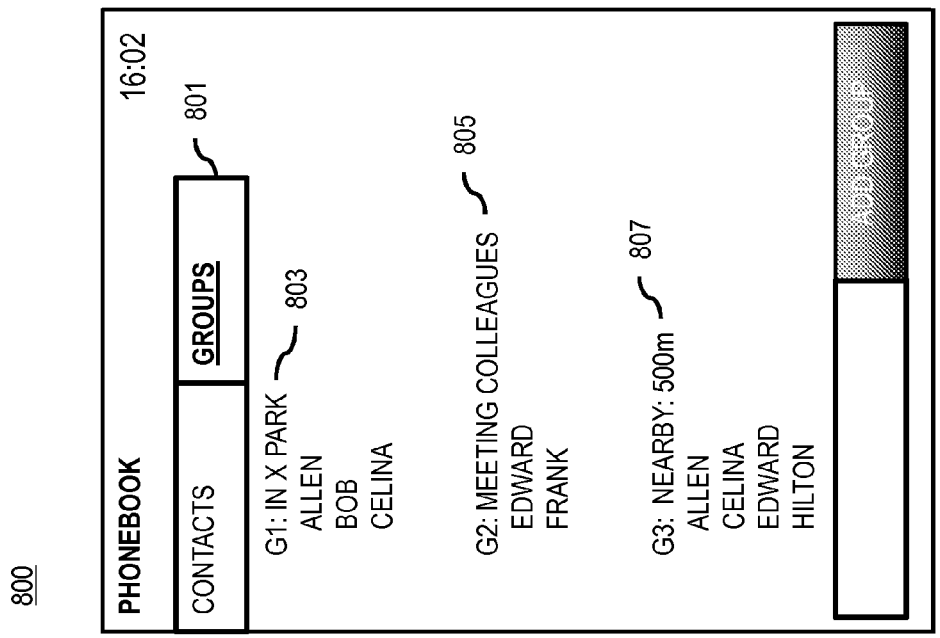

FIG. 8A shows a view of a user interface 800 showing a context-based group view 801 of context-based groups 803, 805, 807. Once a context-based group search is determined, the context-based group can be saved to the group list. For example, a first context-based group 803 can be saved as "In X Park" with a label separate from the context criteria and/or parameters used to generate the context-based group. As shown in user interface 820 of FIG. 8B, the context-based groups 821, 823, 825 can dynamically change over time 827. For example, in group G1 821, within the time between user interface 800 and user interface 820, Bob can leave the park associated with the context criteria and George and Hilton can arrive. Further, in certain embodiments, the context-based groups 821, 823, 825 can be automatically refreshed in real-time, substantially real-time, periodically, based on a push system, based on a polling system, etc.

Figure 8C:
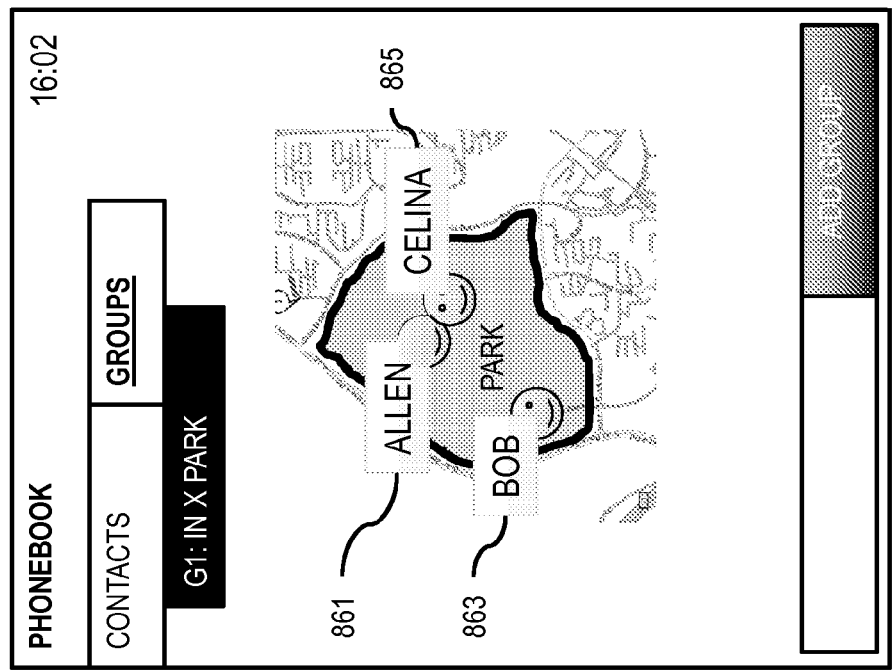

FIG. 8C displays a user interface 840 of a context-based group view 841 of context-based groups, according to one embodiment. A first group 843 "In X Park" is selected. Selection of the first group 843 allows for a menu of selectable options to perform on the first group 843. The options displayed can be filtered and/or selected to be relevant to the particular context criteria and/or parameters used to construct the context-based groups. In one example, communications options are provided to the user. The communications options can include, for example, sending a text message 845, such as a Short Message Service (SMS) message or a Multimedia Messaging Service (MMS) message, sending a voice mail message 847 to one or more of the group members, sending an e-mail 849 to one or more of the group members, chatting 851 with one or more of the group members, etc. Additionally, the first group's "In X Park" criteria can allow for the selection of showing group members on a map 853.

Figure 8D:
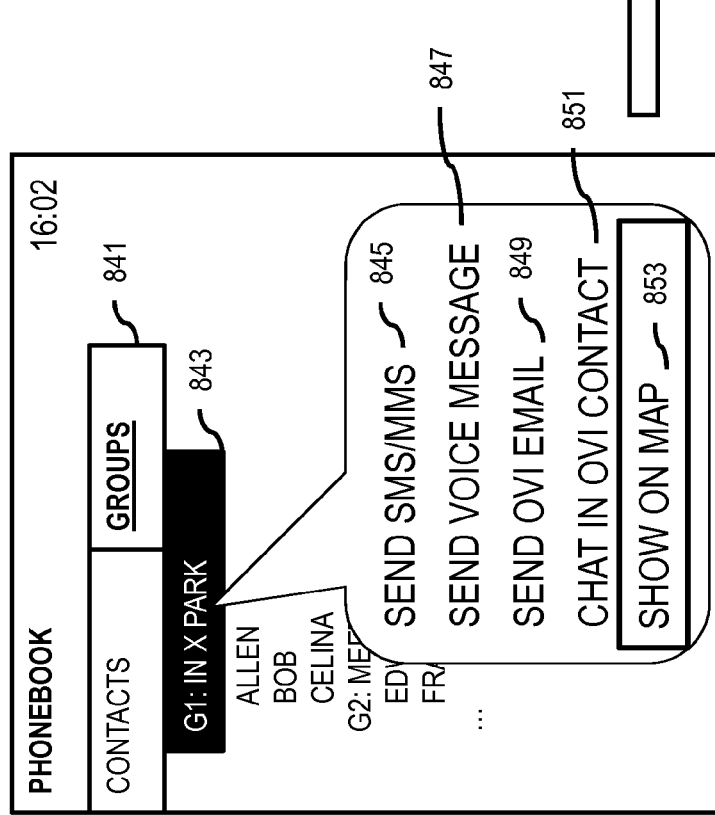

FIG. 8D shows a user interface 860 of an invocation of the map display 853 option, according to one embodiment. The members of the first group 843 can be displayed on a map view associated with the phonebook application. In certain embodiments, the phonebook application can execute the map view. In other embodiments, the phonebook application can call another application to view the first group 843. A view of the members 861, 863, 865 of the first group 843 can be shown on a map associated with X Park. As such, the area surrounding the park can be displayed according to one or more coordinates associated with the park. Then, the members 861, 863, 865 of the first group 843 can be displayed as contact points-of-interest. These points-of-interest can be updated based on movements of the group members 861, 863, 865. Further, when a group member leaves the area associated with X Park, the map display 860 can be updated to remove the group member. Additionally, when a new group member is added the group member can be added to the map display.

With the above approaches, a user can conveniently generate dynamic groups of contacts or other users based on criteria and context information. Processing at a context processing platform 103 can provide the UE 101 with savings of processing as well as increased battery life while allowing the UE 101 to receive context-based group information. Further, real-time updates of context information allows for the context processing platform 103 to update context-based groups in a manner such that the context-based groups generated can change on a regular basis.

The processes described herein for providing dynamic grouping of users based on context may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
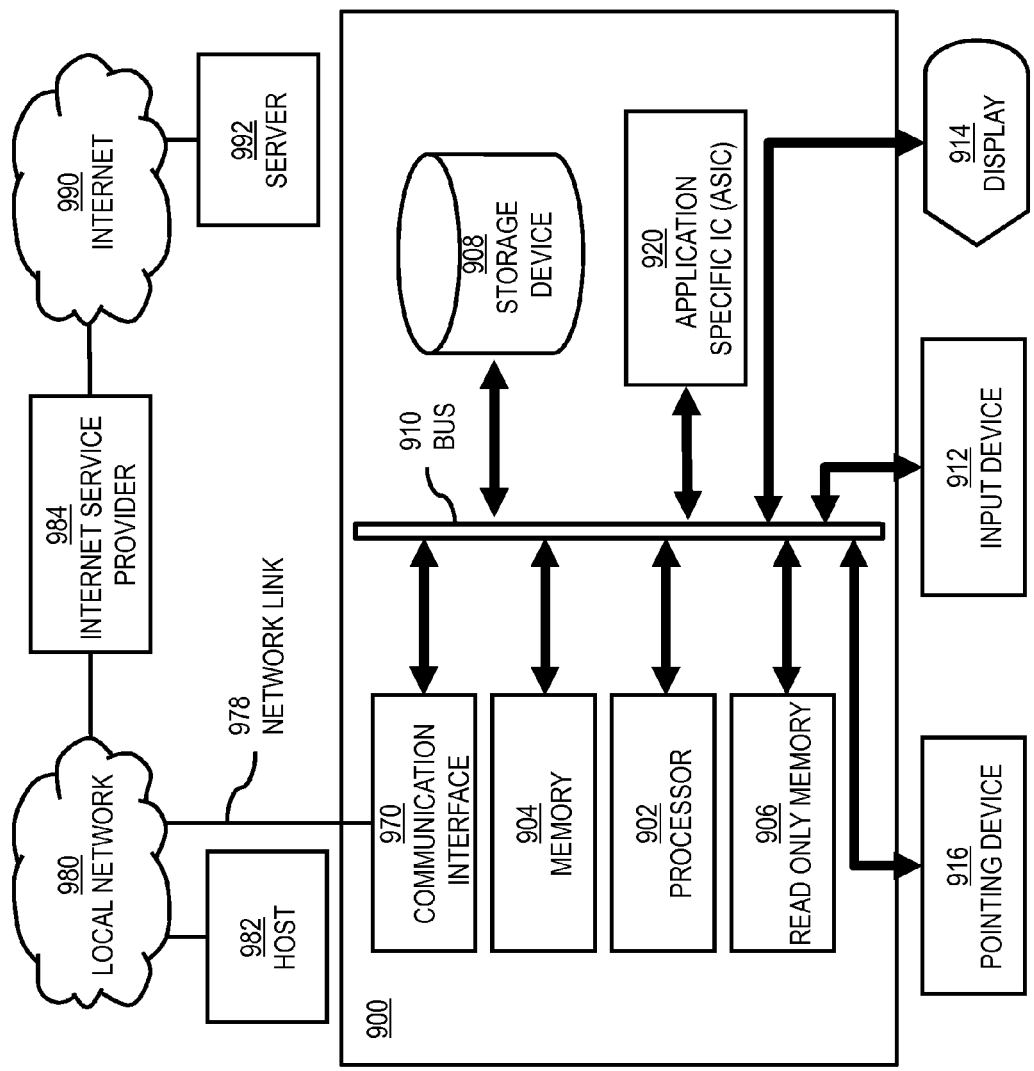
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to dynamically group users based on context as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of dynamically grouping users based on context.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to dynamic grouping of users based on context. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for dynamic grouping of users based on context. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for dynamic grouping of users based on context, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for communication with the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970, In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infrared carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to dynamically group users based on context as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of services. Chip set or chip 1000, or a portion thereof, constitutes a means for performing one or more steps of dynamically grouping users based on context.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real-time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to dynamically group of users based on context. The memory 1005 also stores the data associated with or generated by the execution of the inventive steps.

Figure 11:
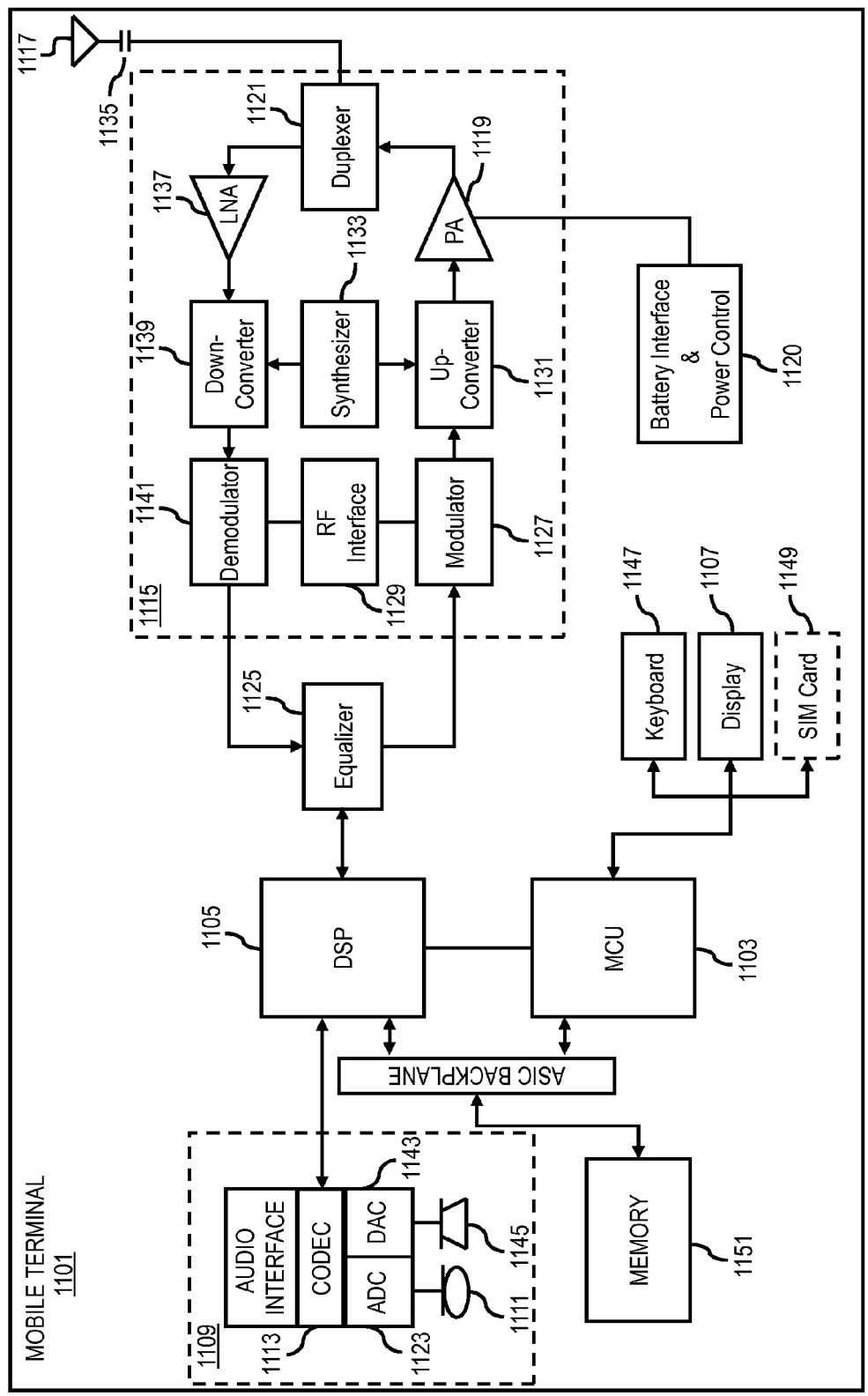
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of dynamically grouping of users based on context. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of dynamically grouping of users based on context. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (CPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairment that occurs during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to dynamically group users based on context. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    an input from a device specifying one or more criteria to determine a context-based user group from among a plurality of other devices, the one or more criteria specifying one or more context parameters;
    at least one determination of one or more context values of the one or more context parameters associated with the plurality of other devices;
    at least one determination of the context-based user group based, at least in part, on the context values and the one or more criteria;
    at least one determination of one or more updates to the context values of the one or more context parameters;
    at least one update to the context-based user group in response to the one or more updates to the context values of the one or more context parameters;
    at least one determination of one or more actions available at the device relevant to the context-based user group;
    at least one determination to present a user interface for initiating at least one of the one or more actions,
    wherein the one or more updates to the context values occur while the one or more context parameters remain unchanged,
    and the at least one update to the context-based user group occurs in real-time with the one or more updates to the context values;
    and at least one determination of one or more structured queries based, at least in part, on the one or more criteria,
    wherein the determining of the context-based user group is based, at least in part, on application of the one or more structured queries to the context values.

2. A method of claim 1, wherein at least one of the one or more criteria is based, at least in part, on one or more contexts of the device.

3. A method of claim 1, wherein the (1) data and/or (2) information and/or (3) at least one signal are further based, at least in part, on the following:
    at least determination of one or more keywords, one or more operators, or a combination thereof from the input,
    wherein the determining of the one or more structured queries is based, at least in part, on the one or more keywords, the one or more operators, or a combination thereof.

4. An apparatus comprising:
    at least one processor;
    and at least one memory including computer program code for one or more programs,
    the at least one memory and the computer program code configured to, with the at least one processor, cause the apparatus to perform at least the following,
    receive an input from a device specifying one or more criteria to determine a context-based user group from among a plurality of other devices, the one or more criteria specifying one or more context parameters;

determine one or more context values of the one or more context parameters associated with the plurality of other devices;

determine the context-based user group based, at least in part, on the values and the one or more criteria;

determine one or more updates to the context values of the one or more context parameters;

update the context-based user group in response to the one or more updates to the context values of the one or more context parameters;

determine one or more actions available at the device relevant to the context-based user croup;

determine to present a user interface for initiating at least one of the one or more actions;

and determine one or more structured queries based, at least in part, on the one or more criteria, wherein the determining of the context-based user group is based, at least in part, on application of the one or more structured queries to the context values.

5. An apparatus of claim 4, wherein at least one of the one or more criteria is based, at least in part, on one or more contexts of the device.

6. An apparatus of claim 4, wherein the apparatus is further caused to:

determine one or more keywords, one or more operators, or a combination thereof from the input, wherein the determining of the one or more structured queries is based, at least in part, on the one or more keywords, the one or more operators, or a combination thereof.

7. A non-transitory computer-readable storage medium carrying one or more sequences of one or more instructions which, when executed by one or more processors, cause an apparatus to at least perform the following steps:

receiving an input from a device specifying one or more criteria to determine a context-based user group from among a plurality of other devices, the one or more criteria specifying one or more context parameters;

determining one or more context values of the one or more context parameters associated with the plurality of other devices;

determining the context-based user group based, at least in part, on the values and the one or more criteria;

determining one or more updates to the context values of the one or more context parameters;

updating the context-based user group in response to the one or more updates to the context values of the one or more context parameters;

determining one or more actions available at the device relevant to the context-based user croup;

determining to present a user interface for initiating at least one of the one or more actions;

and determining one or more structured queries based, at least in part, on the one or more criteria, wherein the determining of the context-based user group is based, at least in part, on application of the one or more structured queries to the context values.

8. A non-transitory computer-readable storage medium of claim 7, wherein at least one of the one or more criteria is based, at least in part, on one or more contexts of the device.

9. A method of claim 1, wherein the one or more context parameters include a distance from the device.

10. A method of claim 9, wherein the context-based user group is a carpool group associated with one or more traffic route measurement parameters.

11. An apparatus of claim 4, wherein the one or more context parameters include a distance from the device.

12. An apparatus of claim 11, wherein the context-based user group is a carpool group associated with one or more traffic route measurement parameters.

13. A non-transitory computer-readable storage medium of claim 7, wherein the one or more context parameters include a distance from the device.

14. A non-transitory computer-readable storage medium of claim 13, wherein the context-based user group is a carpool group associated with one or more traffic route measurement parameters.

* * * * *